(12) United States Patent
Yokoyama et al.

(10) Patent No.: US 12,379,041 B2
(45) Date of Patent: Aug. 5, 2025

(54) STEAM VALVE

(71) Applicant: MITSUBISHI HEAVY INDUSTRIES, LTD., Tokyo (JP)

(72) Inventors: Takashi Yokoyama, Tokyo (JP); Fumiyuki Suzuki, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/143,293

(22) Filed: May 4, 2023

(65) Prior Publication Data

US 2023/0332709 A1 Oct. 19, 2023

Related U.S. Application Data

(63) Continuation of application No. PCT/JP2022/007205, filed on Feb. 22, 2022.

(30) Foreign Application Priority Data

Apr. 30, 2021 (JP) .................. 2021-077778

(51) Int. Cl.
*F16K 1/36* (2006.01)
*F16K 1/42* (2006.01)
*F16K 25/00* (2006.01)

(52) U.S. Cl.
CPC .............. *F16K 25/005* (2013.01); *F16K 1/36* (2013.01); *F16K 1/42* (2013.01)

(58) Field of Classification Search
CPC .. F16K 25/005; F16K 1/36; F16K 1/42; F01L 3/04; F01L 3/22
See application file for complete search history.

(56) References Cited

U.S. PATENT DOCUMENTS 4,723,518 A * 2/1988 Kawasaki ............... F02B 77/02
123/188.8
5,586,530 A 12/1996 Adachi et al.
(Continued)

FOREIGN PATENT DOCUMENTS

JP  H02-196117 A  8/1990
JP  H07-34965 A   2/1995
(Continued)

OTHER PUBLICATIONS

International Search Report dated Mar. 22, 2022, issued in counterpart Application No. PCT/JP2022/007205. (9 pages).
(Continued)

*Primary Examiner* — Marina A Tietjen
(74) *Attorney, Agent, or Firm* — WHDA, LLP

(57) ABSTRACT

A steam valve including a valve seat and a valve body, each of which has: a first layer formed on a base material and made of a material different from the base material; and a second layer formed on the first layer in a contact position between the valve body and the valve seat and made of a material different from the base material and the first layer. On one side or the other side of a steam passage regarding at least one of the valve body or the valve seat, a minimum curvature radius of the first layer in a cross-section along a direction of relative movement between the valve body and the valve seat is equal to or larger than the smaller of a minimum curvature radius of a surface of the base material or a minimum curvature radius of a surface of the second layer.

7 Claims, 7 Drawing Sheets

(56) References Cited

U.S. PATENT DOCUMENTS

| | | | | | |
|---|---|---|---|---|---|
| 5,649,358 | A | * | 7/1997 | Adachi | F01L 3/22 |
| | | | | | 29/888.42 |
| 5,687,685 | A | * | 11/1997 | Amano | F01L 3/22 |
| | | | | | 123/193.5 |
| 5,692,726 | A | * | 12/1997 | Adachi | C23C 26/02 |
| | | | | | 123/188.8 |
| 5,742,020 | A | * | 4/1998 | Adachi | F01L 3/22 |
| | | | | | 228/195 |
| 5,848,579 | A | * | 12/1998 | Adachi | F02F 1/38 |
| | | | | | 123/188.8 |
| 5,860,401 | A | * | 1/1999 | Adachi | B23K 20/2275 |
| | | | | | 123/188.8 |
| 6,138,351 | A | * | 10/2000 | Adachi | F01L 3/22 |
| | | | | | 123/188.8 |

FOREIGN PATENT DOCUMENTS

| | | |
|---|---|---|
| JP | H10-176764 A | 6/1998 |
| JP | 2006-009052 A | 1/2006 |
| JP | 2010-236385 A | 10/2010 |
| JP | 2012-061514 A | 3/2012 |
| JP | 2014-001702 A | 1/2014 |
| JP | 2019-005784 A | 1/2019 |

OTHER PUBLICATIONS

Notification of Transmittal of Translation of the International Preliminary Report on Patentability (Form PCT/IB/338) issued in counterpart International Application No. PCT/JP2022/007205 mailed Nov. 9, 2023 with Forms PCT/IB/373, PCT/IB/326, and PCT/ISA/237, with English translation. (12 pages).

* cited by examiner

STEAM VALVE

The present application claims priority based on Japanese Patent Application No. 2021-077778 filed on Apr. 30, 2021, the entire content of which is incorporated herein by reference. The present application is a continuation application based on a PCT Patent Application No. PCT/JP2022/007205 whose priority is claimed on Japanese Patent Application No. 2021-077778. The content of the PCT Application is incorporated herein by reference.

TECHNICAL FIELD

The present disclosure relates to a steam valve.

BACKGROUND ART

For example, a steam valve used in applications such as controlling the flow rate of steam supplied to a steam turbine is overlaid with cobalt-based alloy or the like in order to suppress wear caused by high-temperature and high-pressure steam circulating at high speed (see Patent Document 1).

CITATION LIST

Patent Literature

Patent Document 1: JP2012-61514A

SUMMARY

Problems to be Solved

For example, in Patent Document 1, in order to suppress cracking of an overlay layer made of cobalt-based alloy, a buttering layer of nickel-based alloy is formed between a base material made of iron-based alloy and the overlay layer to prevent dissolution of iron from the base metal into the overlay layer.

However, the buttering layer of nickel-based alloy is softer than the overlay layer of cobalt-based alloy. Therefore, it is required to suppress wear of a portion of the buttering layer appearing on the surface of parts of a steam valve.

In view of the above, an object of at least one embodiment of the present disclosure is to suppress wear of parts of a steam valve.

Solution to the Problems (1) A steam valve according at least one embodiment of the present disclosure includes: a valve seat; and a valve body. Each of the valve body and the valve seat has: a first layer formed on a base material and made of a material different from the base material; and a second layer formed on the first layer at least in a contact position between the valve body and the valve seat and made of a material different from the base material and the first layer. On at least one of one side or the other side of a steam passage separated by the contact position between the valve body and the valve seat, regarding at least one of the valve body or the valve seat, a minimum curvature radius of the first layer in a cross-section along a moving direction of relative movement between the valve body and the valve seat is equal to or larger than the smaller of a minimum curvature radius of a surface of the base material or a minimum curvature radius of a surface of the second layer.

Advantageous Effects

According to at least one embodiment of the present disclosure, it is possible to suppress wear of parts of a steam valve.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

A steam valve according to some embodiments will now be described.

Figure 1A:
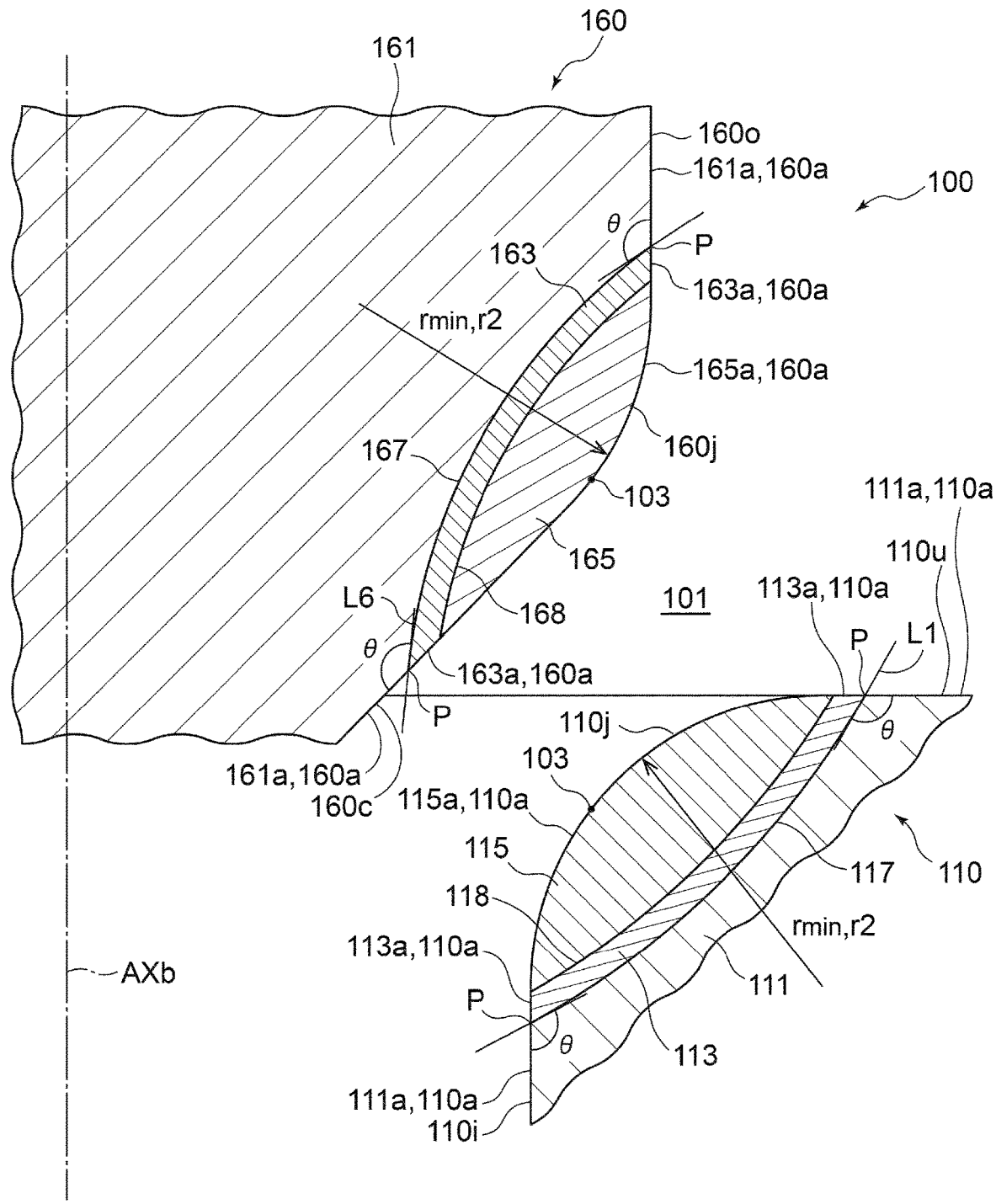
FIG. 1A is a schematic cross-sectional view of a valve seat and a valve body of a steam valve according to an embodiment.

FIG. 1A is a schematic cross-sectional view of a valve seat and a valve body of a steam valve according to an embodiment.

Figure 1B:
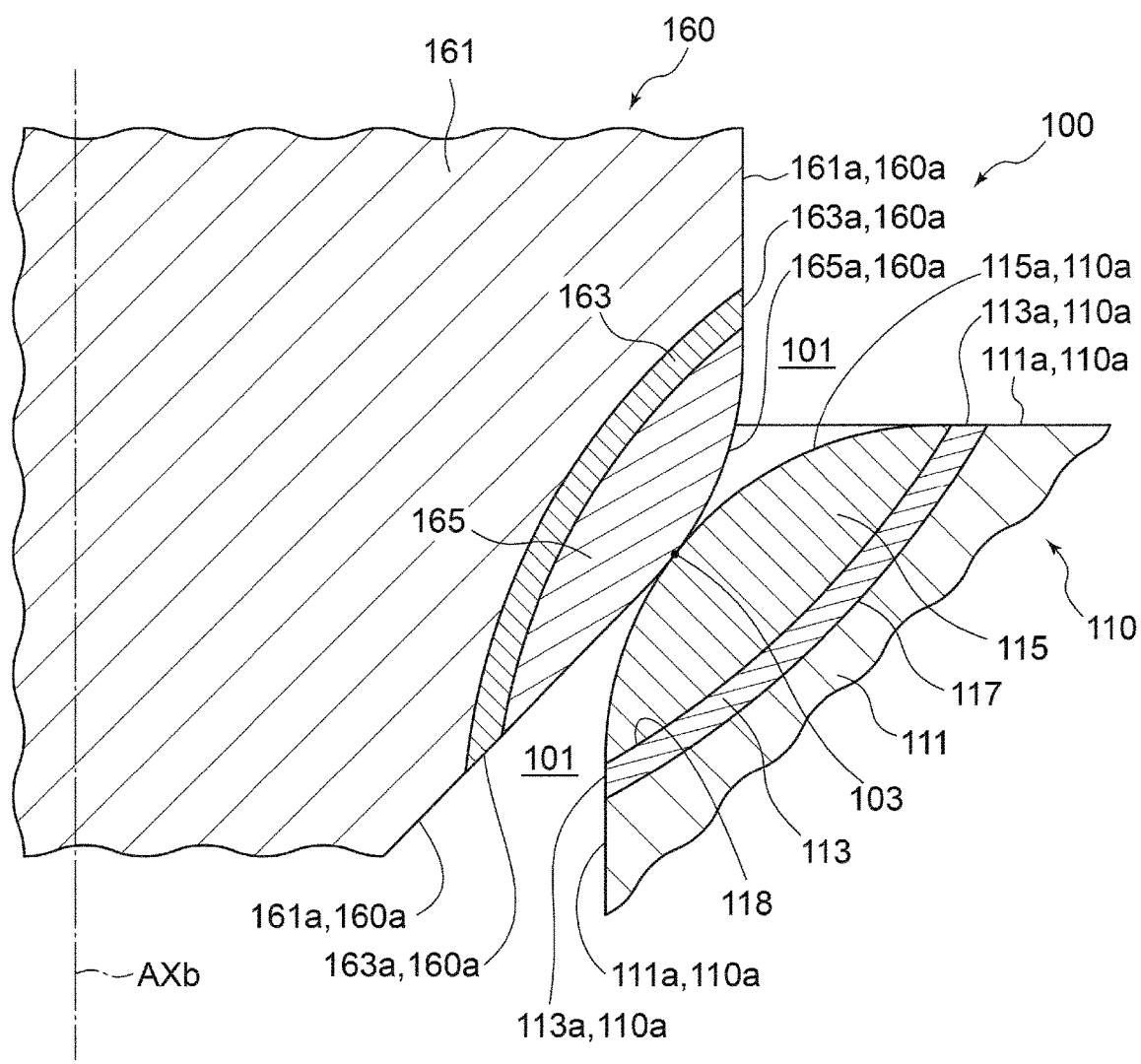
FIG. 1B is a schematic cross-sectional view of the steam valve shown in FIG. 1A when the valve is in the closed position.

FIG. 1B is a schematic cross-sectional view of the steam valve shown in FIG. 1A when the valve is in the closed position.

Figure 2:
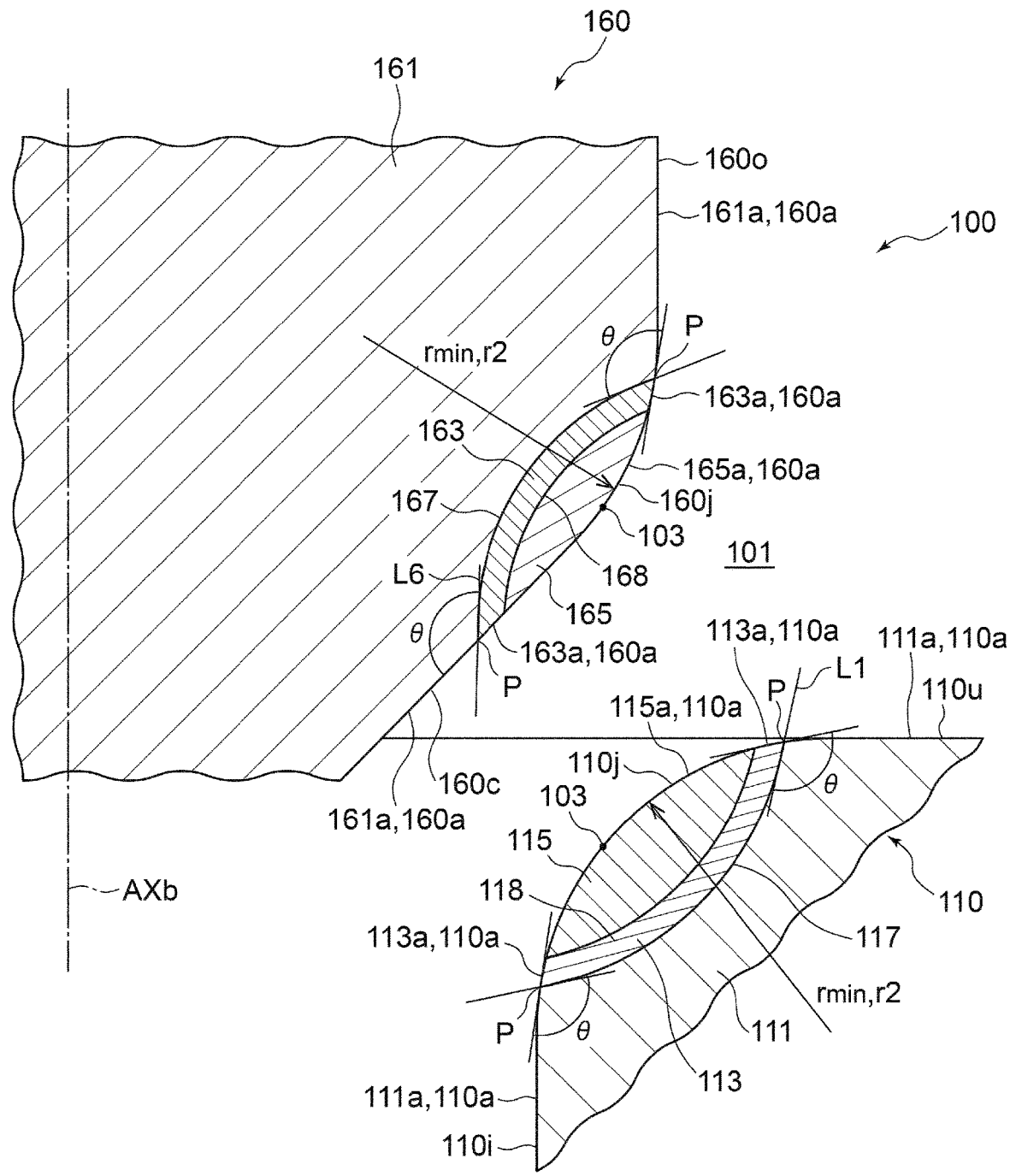
FIG. 2 is a schematic cross-sectional view of a valve seat and a valve body of a steam valve according to another embodiment.

FIG. 2 is a schematic cross-sectional view of a valve seat and a valve body of a steam valve according to another embodiment.

Figure 3:
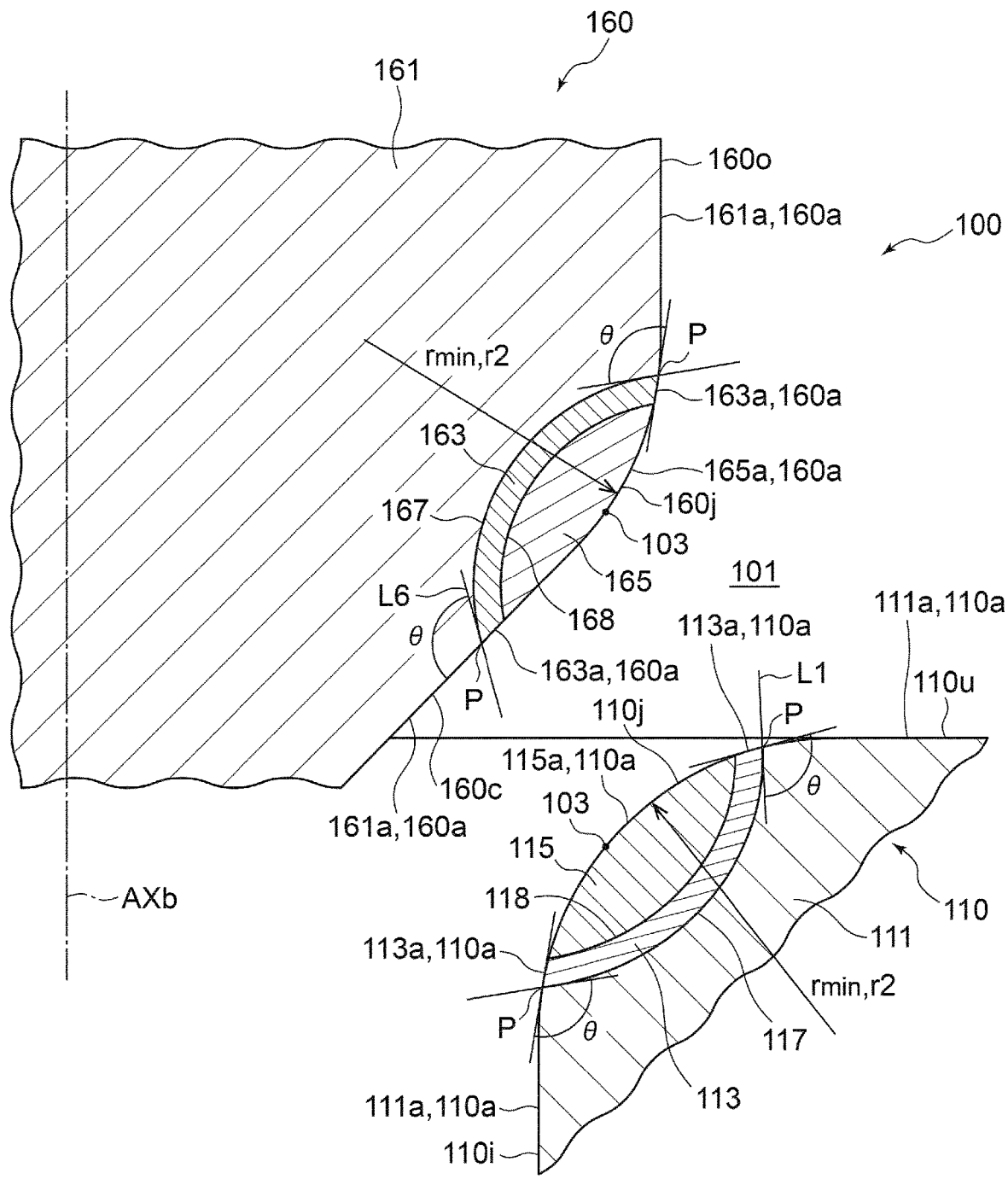
FIG. 3 is a schematic cross-sectional view of a valve seat and a valve body of a steam valve according to still another embodiment.

FIG. 3 is a schematic cross-sectional view of a valve seat and a valve body of a steam valve according to still another embodiment.

Figure 4:
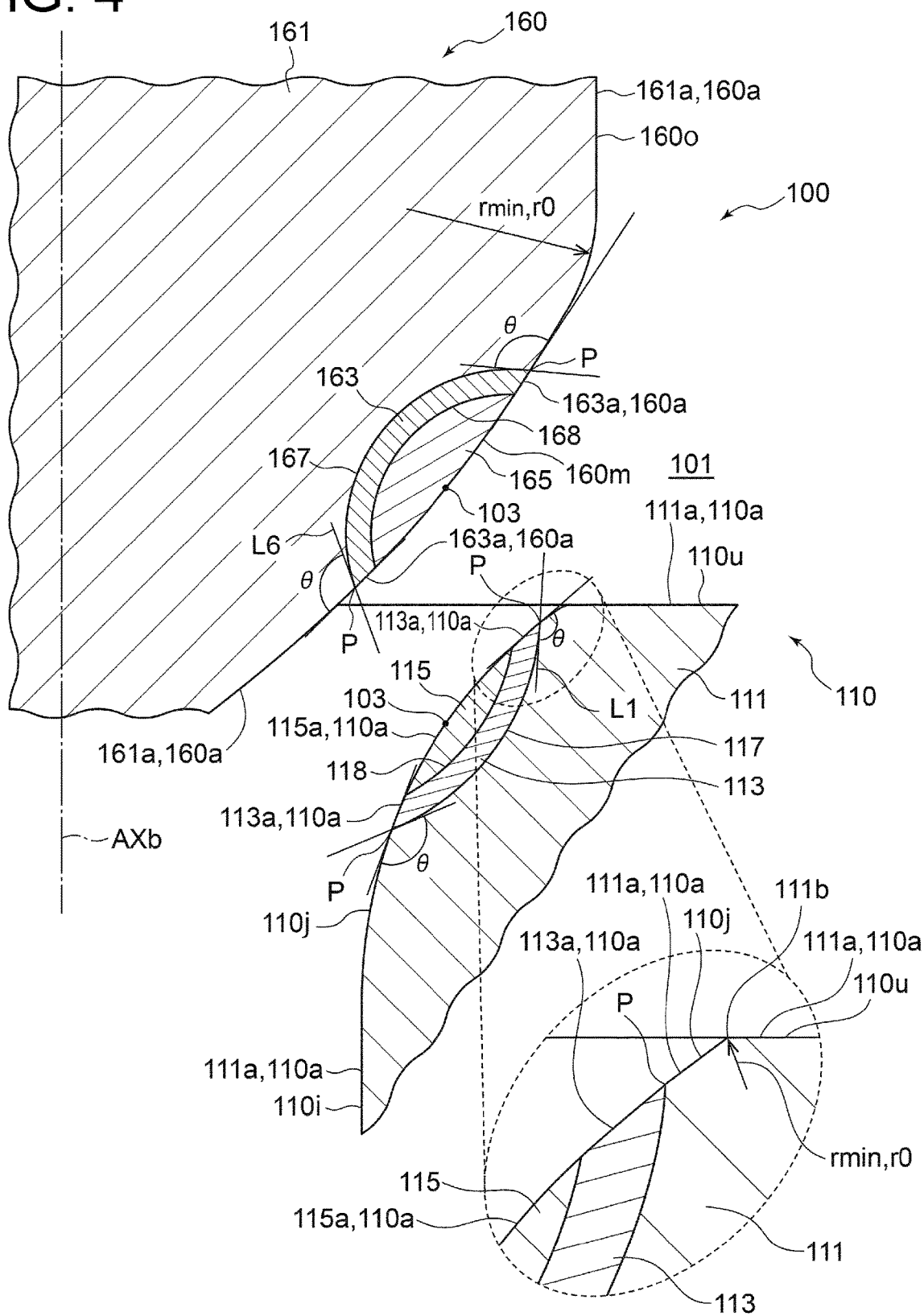
FIG. 4 is a schematic cross-sectional view of a valve seat and a valve body of a steam valve according to still another embodiment.

FIG. 4 is a schematic cross-sectional view of a valve seat and a valve body of a steam valve according to still another embodiment.

Figure 5:
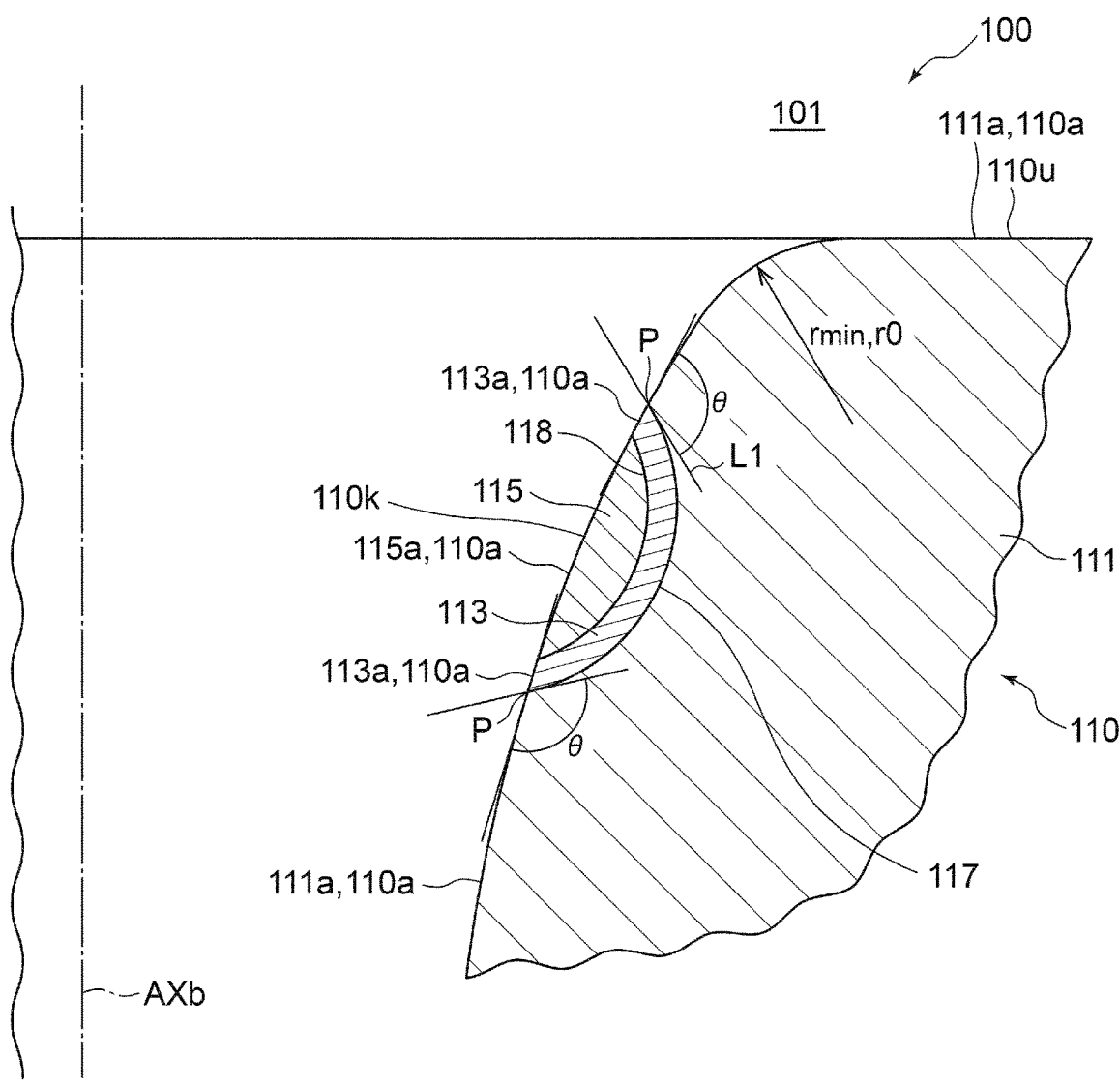
FIG. 5 is a schematic cross-sectional view of a valve seat of a steam valve according to still another embodiment.

FIG. 5 is a schematic cross-sectional view of a valve seat of a steam valve according to still another embodiment.

A steam valve 100 according to some embodiments includes a valve seat 110 having a valve seat surface 110a facing a steam passage 101 in the valve, and a valve body 160 having a valve body surface 160a facing the steam passage 101.

The steam valve 100 according to some embodiments is configured to control the flow rate of steam flowing through the steam passage 101 by relatively moving the valve seat 110 and the valve body 160, more specifically, by moving the valve body 160 along the central axis AXb of the valve body 160 relative to the valve seat 110 fixed to a valve box (not shown). That is, the extension direction of the central axis AXb of the valve body 160 is the direction of relative movement between the valve seat 110 and the valve body 160.

In the steam valve 100 according to some embodiments, the valve seat 110 has a first layer 113 formed on a base material 111 and made of a material different from the base material 111, and a second layer 115 formed on the first layer 113 at least in a contact position 103 between the valve body 160 and the valve seat 110 and made of a material different from the base material 111 and the first layer 113.

Specifically, the base material 111 of the valve seat 110 according to some embodiments is made of iron-based alloy. In the valve seat 110 according to some embodiments, the first layer 113 is made of, for example, nickel-based alloy. In the valve seat 110 according to some embodiments, the second layer 115 is made of, for example, cobalt-based alloy.

In the valve seat 110 according to some embodiments, the second layer 115 is an overlay layer formed from one side to the other side of the steam passage 101 separated by the contact position 103 with the valve body 160. In the valve seat 110 according to some embodiments, the first layer 113 is a buttering layer provided between the base material 111 and the second layer 115 to suppress cracking of the second layer 115 of cobalt-based alloy.

In the steam valve 100 according to some embodiments, the valve body 160 has a first layer 163 formed on a base material 161 and made of a material different from the base material 161, and a second layer 165 formed on the first layer 163 at least in the contact position 103 between the valve body 160 and the valve seat 110 and made of a material different from the base material 161 and the first layer 163.

Specifically, the base material 161 of the valve body 160 according to some embodiments is made of iron-based alloy. In the valve body 160 according to some embodiments, the first layer 163 is made of, for example, nickel-based alloy. In the valve body 160 according to some embodiments, the second layer 165 is made of, for example, cobalt-based alloy.

In the valve body 160 according to some embodiments, the second layer 165 is an overlay layer formed from one side to the other side of the steam passage 101 separated by the contact position 103 with the valve seat 110. In the valve body 160 according to some embodiments, the first layer 163 is a buttering layer provided between the base material 161 and the second layer 165 to suppress cracking of the second layer 165 of cobalt-based alloy.

In the steam valve 100 according to some embodiments, in order to suppress wear of the valve seat 110 and the valve body 160 due to relatively high-temperature and high-pressure steam flowing through the steam passage 101 at relatively high speed, as described above, the valve is overlaid with the second layer 115, 165 of cobalt-based alloy.

If an overlay layer of cobalt-based alloy is directly formed on the base material 111, 161 of iron-based alloy, the overlay layer may separate from the base material 111, 161 in the process of use. Therefore, in the steam valve 100 according to some embodiments, as described above, the first layer 113, 163 is disposed between the base material 111, 161 and the second layer 115, 165.

In the steam valve 100 according to some embodiments, for example as shown in FIG. 1B, the second layers 115, 165 are disposed such that the second layer 115 of the valve seat 110 and the second layer 165 of the valve body 160 are in contact with each other when the valve seat 110 and the valve body 160 are in contact with each other.

(Material of Base Material 111, 161)

In the steam valve 100 according to some embodiments, the iron-based alloy making up the base material 111, 161 is preferably a Fe-based heat-resistant material, which is conventionally used for valve bodies and valve seats of steam valves, i.e., heat-resistant steel. Preferably, the heat-resistant steel contains 75 mass % or more Fe and one or more alloy elements, such as Cr, Mo, V, W, and Nb, for improving the heat resistance, although it is not basically limited. The steel type and steel composition of the heat-resistant steel are not particularly limited, but typical examples include Cr steels such as 9Cr steel and 12Cr steel, Cr-Mo steels, and Cr-Mo-V steels. Illustrative examples include SUH1, SUH3, SUH4, SUH11, SUH600, SUH616 defined by JIS G 4311, or similar heat resistant steels.

(Material of First Layer 113, 163)

In the steam valve 100 according to some embodiments, the nickel-based alloy making up the first layer 113, 163 may be, for example, Inconel 625 or Inconel 82. Inconel is a registered trademark.

(Material of Second Layer 115, 165)

In the steam valve 100 according to some embodiments, the cobalt-based alloy making up the second layer 115, 165 may be, for example, Co-Cr heat-resistant alloy known under the trade name "Stellite," or Co-Cr heat-resistant alloy similar to Stellite. The composition of the Co-Cr heat-resistant alloy is preferably, for example, in terms of mass %, Cr: 24 to 32%, W: 0 to 20%, C: 0.2 to 3.5%, Mo: 0 to 6%, Ni: 0 to 25%, Fe: 3% or less, and the remainder is Co and impurities.

(Wear Suppression of First Layer 113, 163)

As described above, the first layer 113, 163 according to some embodiments is made of nickel-based alloy. Therefore, the first layer 113, 163 is softer than the second layer 115, 165 made of cobalt-based alloy. Therefore, it is required to suppress wear of a portion of the first layer 113, 163 appearing on the surfaces of the valve seat 110 and the valve body 160 (valve seat surface 110a and valve body surface 160a).

In the following description, when the term "surface" is used for the valve seat 110 or the valve body 160, unless otherwise specified, it refers to the surface that faces the steam passage 101 in the valve. In other words, in the following description, when the term "surface" is used for the valve seat 110 or the valve body 160, unless otherwise specified, it refers to at least a portion of the valve seat surface 110a or the valve body surface 160a.

For example, if the surface 113a, 163a of the first layer 113, 163 protrudes more than the surface 111a, 161a of the base material 111, 161 or the surface 115a, 165a of the second layer 115, 165, the flow of steam may be disturbed on the surface 113a, 163a of the first layer 113, 163, so that the surface 113a, 163a of the first layer 113, 163 is likely to be worn.

For this reason, it is desirable that the surface 113a, 163a of the first layer 113, 163 forms a gently curved surface together with the surface 111a, 161a of the base material 111, 161 and the surface 115a, 165a of the second layer 115, 165 adjacent to the surface 113a, 163a. In other words, in a cross-section appearing when cut in a plane including the central axis AXb of the valve body 160 as shown in FIGS. 1A to 5, it is desirable that the surface 113a, 163a of the first layer 113, 163 is formed as a smooth curve or a straight line together with the surface 111a, 161a of the base material 111, 161 and the surface 115a, 165a of the second layer 115, 165 adjacent to the surface 113a, 163a.

The valve seat surface 110a of the valve seat 110 shown in FIGS. 1A, 1B, and 2 to 4 includes an upper surface 110u which is a plane perpendicular to the central axis AXb of the valve body 160, and an inner peripheral surface 110i corresponding to the inner peripheral surface of the cylinder centered on the central axis AXb of the valve body 160. In the valve seat 110 shown in FIGS. 1A, 1B, and 2 to 4, the upper surface 110u and the inner peripheral surface 110i may be conical surfaces.

In FIGS. 1A, 1B, and 2 to 4, the upper surface 110u and the inner peripheral surface 110i are represented by straight lines.

In the valve seat 110 shown in FIGS. 1A, 1B, 2, and 3, the upper surface 110u and the inner peripheral surface 110i are gently connected by a connection surface 110j, which is a curved surface represented as a curve in the cross-section shown in the figures.

In the valve seat 110 shown in FIGS. 1A and 1B, the interface 117 between the base material 111 and the first layer 113 appears on the upper surface 110u and the inner peripheral surface 110i.

In the valve seat 110 shown in FIGS. 1A and 1B, the curvature radius of the connection surface 110j may be constant regardless of the position or may vary depending on the position in the cross-section shown in FIGS. 1A and 1B.

In the valve seat 110 shown in FIGS. 2 and 3, the interface 117 between the base material 111 and the first layer 113 appears on the connection surface 110j.

In the valve seat 110 shown in FIGS. 2 and 3, the curvature radius of the connection surface 110j may be constant regardless of the position or may vary depending on the position in the cross-section shown in FIGS. 2 and 3.

However, when the curvature radius of the connection surface 110j varies depending on the position, the minimum curvature radius of the surface 113a of the first layer 113 is preferably equal to or larger than the smaller of the minimum curvature radius of the surface 111a of the base material 111 or the minimum curvature radius of the surface 115a of the second layer 115.

In the valve seat 110 shown in FIG. 4, the inner peripheral surface 110i is gently connected to the connection surface 110j.

In the valve seat 110 shown in FIG. 4, the upper surface 110u is connected to the connection surface 110j so as to cross at a corner portion 111b, which will be described later.

The valve seat surface 110a of the valve seat 110 shown in FIG. 5 includes an upper surface 110u which is a plane perpendicular to the central axis AXb of the valve body 160, and an inner peripheral surface 110k as described below. In the valve seat 110 shown in FIG. 5, the upper surface 110u may be a conical surface.

In the cross-section shown in FIG. 5, the inner peripheral surface 110k shown in FIG. 5 has the minimum curvature radius $r_{min}$ at a position relatively close to the upper surface 110u along the central axis AXb of the valve body 160 and has a larger curvature radius r than the curvature radius $r_{min}$ at a position relatively far from the upper surface 110u along the central axis AXb of the valve body 160. The curvature radius r may be constant regardless of the position or may vary depending on the position.

In the valve seat 110 shown in FIG. 5, the interface 117 between the base material 111 and the first layer 113 appears in a region of the inner peripheral surface 110k having the curvature radius r.

The valve body surface 160a of the valve body 160 shown in FIGS. 1A, 1B, 2, and 3 includes an outer peripheral surface 160o corresponding to the outer peripheral surface of the tube or cylinder centered on the central axis AXb of the valve body 160, and a conical surface 160c corresponding to the conical surface centered on the central axis AXb of the valve body 160. In the valve body 160 shown in FIGS. 1A, 1B, 2, and 3, the outer peripheral surface 160o may be a conical surface.

In FIGS. 1A, 1B, 2, and 3, the outer peripheral surface 160o and the conical surface 160c are represented by straight lines.

In the valve body 160 shown in FIGS. 1A, 1B, 2, and 3, the outer peripheral surface 160o and the conical surface 160c are gently connected by a connection surface 160j, which is a curved surface represented as a curve in the cross-section shown in the figures.

In the valve body 160 shown in FIGS. 1A and 1B, the interface 167 between the base material 161 and the first layer 163 appears on the outer peripheral surface 160o and the conical surface 160c.

In the valve body 160 shown in FIGS. 1A and 1B, the curvature radius of the connection surface 160j may be constant regardless of the position or may vary depending on the position in the cross-section shown in FIGS. 1A and 1B.

In the valve body 160 shown in FIGS. 2 and 3, the interface 167 between the base material 161 and the first layer 163 appears on the conical surface 160c in the region close to the valve seat 110 across the contact position 103, and appears on the connection surface 110j in the region far from the valve seat 110 across the contact position 103.

In the valve body 160 shown in FIGS. 2 and 3, the curvature radius of the connection surface 110j may be constant regardless of the position or may vary depending on the position in the cross-section shown in FIGS. 2 and 3.

However, when the curvature radius of the connection surface 110j varies depending on the position, the minimum curvature radius of the surface 163a of the first layer 163 is preferably equal to or larger than the smaller of the minimum curvature radius of the surface 161a of the base material 161 or the minimum curvature radius of the surface 165a of the second layer 165.

The valve body surface 160a of the valve body 160 shown in FIG. 4 includes an outer peripheral surface 160o corresponding to the outer peripheral surface of the tube or cylinder centered on the central axis AXb of the valve body 160, and an outer peripheral surface 160m as described below. In the valve body 160 shown in FIG. 4, the outer peripheral surface 160o may be a conical surface.

In the cross-section shown in FIG. 4, the outer peripheral surface 160m shown in FIG. 4 has the minimum curvature radius $r_{min}$ at a position relatively far from the valve seat 110 along the central axis AXb of the valve body 160 and has a larger curvature radius r than the curvature radius $r_{min}$ at a position relatively close to the valve seat 110 along the central axis AXb of the valve body 160. The curvature radius r may be constant regardless of the position or may vary depending on the position.

In the valve body 160 shown in FIG. 4, the interface 167 between the base material 161 and the first layer 163 appears in a region of the outer peripheral surface 160m having the curvature radius r.

Therefore, in the steam valve 100 according to some embodiments, as shown in FIGS. 1A to 5, in the cross-section shown in FIGS. 1A to 5, the surface 113a, 163a of the first layer 113, 163 is formed as a smooth curve or a straight line together with the surface 111a, 161a of the base material 111, 161 and the surface 115a, 165a of the second layer 115, 165 adjacent to the surface 113a, 163a.

Thereby, it is possible to suppress wear of the surface 113a, 163a of the first layer 113, 163.

Additionally, in order to suppress wear of the surface 113a, 163a of the first layer 113, 163, in the cross-section shown in FIGS. 1A to 5, the curvature radius r1 of the surface 113a, 163a of the first layer 113, 163 is preferably large.

Therefore, in the steam valve 100 according to some embodiments, on at least one of one side or the other side of the steam passage 101 separated by the contact position 103 between the valve body 160 and the valve seat 110, the minimum curvature radius of the first layer 113, 163 of at least one of the valve body 160 or the valve seat 110 in a cross-section along the direction of relative movement between the valve body 160 and the valve seat 110 is equal to or larger than the smaller of the minimum curvature radius of the surface of the base material 111, 161 or the minimum curvature radius of the surface of the second layer 115, 165.

That is, in the steam valve 100 according to some embodiments, on at least one of one side or the other side of the steam passage 101 separated by the contact position 103, the surface with the smallest curvature radius r of at least one of the valve body surface 160a or the valve seat surface 110a includes the surface 115a, 165a of the second layer 115, 165 or the surface 111a, 161a of the base material 111, 161 in the cross-section shown in FIGS. 1A to 5. In other words, the minimum curvature radius of the first layer 113, 163 is not less than the minimum curvature radius of the surface of the base material 111, 161 and the minimum curvature radius of the surface of the second layer 115, 165.

For example, in the embodiment of FIGS. 1A and 1B, as shown in FIG. 1A, the minimum curvature radius $r_{min}$ of the surface of the valve seat 110 is the curvature radius r2 of the surface 115a of the second layer 115, and the minimum curvature radius $r_{min}$ of the surface of the valve body 160 is the curvature radius r2 of the surface 165a of the second layer 165.

For example, in the embodiment of FIGS. 2 and 3, the minimum curvature radius $r_{min}$ of the surface of the valve seat 110 is the curvature radius r2 of the surface 115a of the second layer 115, and the minimum curvature radius $r_{min}$ of the surface of the valve body 160 is the curvature radius r2 of the surface 165a of the second layer 165.

For example, in the embodiment of FIG. 4, the minimum curvature radius $r_{min}$ of the surface of the valve seat 110 is the curvature radius r0 of the surface 111a of the base material 111, and the minimum curvature radius $r_{min}$ of the surface of the valve body 160 is the curvature radius r0 of the surface 161a of the base material 161.

In FIG. 4, the base material 111 of the valve seat 110 has a corner portion 111b that protrudes toward the steam passage 101. Since the corner portion 111b is exposed to the steam passage 101, the curvature radius of the surface at the corner portion 111b is the smallest in the valve seat 110.

For example, in the embodiment of FIG. 5, the minimum curvature radius $r_{min}$ of the surface of the valve seat 110 is the curvature radius r0 of the surface 111a of the base material 111.

Thus, in the cross-section shown in FIGS. 1A to 5, the curvature radius r1 of the surface 113a, 163a of the first layer 113, 163 is equal to or larger than the minimum curvature radius $r_{min}$ of the surface of the valve body 160 or the valve seat 110. Therefore, compared to the case where the curvature radius r1 of the surface of the first layer 113, 163 is smaller than the smaller minimum curvature radius $r_{min}$ of the minimum curvature radius $r_{min}$ of the surface 111a, 161a of the base material 111, 161 or the minimum curvature radius $r_{min}$ of the surface 115a, 165a of the second layer 115, 165, it is possible to suppress wear of the surface 113a, 163a of the first layer 113, 163 due to high-temperature and high-pressure steam flowing through the steam passage 101 in the valve at high speed.

(Intersection Angle θ at Intersection Position P)

As shown in FIGS. 1A to 5, in some embodiments, in the cross-section shown in FIGS. 1A to 5, an intersection angle θ between the interface 117, 167 between the base material 111, 161 and the first layer 113, 163 and the surface 111a, 161a of the base material 111, 161 may be equal to or larger than 90 degrees at an intersection position P between the interface 117, 167 and the surface 111a, 161a of the base material 111, 161.

As a result, compared to the case where the intersection angle θ is smaller than 90 degrees at the intersection position P, when the first layer 113, 163 is overlaid on the base material 111, 161 by welding, the shape of the corners of the base material 111, 161 corresponding to the intersection positions P is less likely to collapse.

(Extension Direction of Interface 117, 167 at Intersection Position P)

In the embodiments shown in FIGS. 1A to 2, in the cross-section of the valve body 160 shown in the figures, the intersection position P appears in two positions on radially inner and outer sides with reference to the central axis AXb of the valve body 160. The extension direction of the interface 167 at the intersection position P on the radially inner side of the intersection positions P in the two positions may be inclined with respect to the central axis AXb so as to approach the central axis AXb toward a direction in which the valve body 160 approaches the valve seat 110 in the moving direction of the valve body 160.

In other words, in the embodiments shown in FIGS. 1A to 2, the tangent line L6 of the interface 167 at the intersection position P on the radially inner side may be inclined with respect to the central axis AXb so as to approach the central axis AXb toward the direction in which the valve body 160 approaches the valve seat 110 in the moving direction of the valve body 160.

In the vicinity of the intersection position P on the radially inner side, the interface 167 is directed radially inward toward the direction in which the valve body 160 approaches the valve seat 110 in the moving direction of the valve body 160. Therefore, when the valve body 160 before forming the first layer 163 is viewed from the valve seat 110 side along the central axis AXb, the surface of the groove in the valve body 160, i.e., the surface of the base material 161, on which the first layer 163 is to be formed, is not hidden by the portion corresponding to the intersection position P on the radially inner side. Therefore, when the valve body 160 before forming the first layer 163 is welded from the valve seat 110 side along the central axis AXb to form the first layer 163, the portion corresponding to the intersection position P on the radially inner side does not interfere with the formation of the first layer 163. This facilitates the formation of the first layer 163 in the valve body 160.

Further, in the embodiments shown in FIGS. 1A to 2 and 4, in the cross-section of the valve seat 110 shown in the figures, the intersection position P appears in two positions on radially inner and outer sides with reference to the central axis AXb of the valve body 160. The extension direction of the interface 117 at the intersection position P on the radially outer side of the intersection positions P in the two positions may be inclined with respect to the central axis AXb so as to approach the central axis AXb toward the direction in which the valve body 160 approaches the valve seat 110 in the moving direction of the valve body 160.

In other words, in the embodiments shown in FIGS. 1A to 2 and 4, the tangent line L1 of the interface 117 at the intersection position P on the radially outer side may be inclined with respect to the central axis AXb so as to approach the central axis AXb toward the direction in which the valve body 160 approaches the valve seat 110 in the moving direction of the valve body 160.

In the vicinity of the intersection position P on the radially outer side, the interface 117 is directed radially outward toward a direction in which the valve body 160 recedes from the valve seat 110 in the moving direction of the valve body 160. Therefore, when the valve seat 110 before forming the first layer 113 is viewed from the valve body 160 side along the central axis AXb, the surface of the groove in the valve seat 110, i.e., the surface of the base material 111, on which the first layer 113 is to be formed, is not hidden by the portion corresponding to the intersection position P on the radially outer side. Therefore, when the valve seat 110 before forming the first layer 113 is welded from the valve body 160 side along the central axis AXb to form the first layer 113, the portion corresponding to the intersection position P on the radially outer side does not interfere with the formation of the first layer 113. This facilitates the formation of the first layer 113 in the valve seat 110.

In the embodiments shown in FIGS. 3 and 4, in the cross-section of the valve body 160 shown in FIGS. 3 and 4, the intersection position P appears in two positions on radially inner and outer sides with reference to the central axis AXb of the valve body 160. The extension direction of the interface 167 at the intersection position P on the radially inner side of the intersection positions P in the two positions may be inclined with respect to the central axis AXb so as to recede from the central axis AXb toward the direction in which the valve body 160 approaches the valve seat 110 in the moving direction of the valve body 160.

In other words, in the embodiments shown in FIGS. 3 and 4, the tangent line L6 of the interface 167 at the intersection position P on the radially inner side may be inclined with respect to the central axis AXb so as to recede from the central axis AXb toward the direction in which the valve body 160 approaches the valve seat 110 in the moving direction of the valve body 160.

In the vicinity of the intersection position P on the radially inner side, the interface 167 is directed radially outward toward the direction in which the valve body 160 approaches the valve seat 110 in the moving direction of the valve body 160. Therefore, even if the first layer 163 is separated from the base material 161 at the interface 167, the first layer 163 interferes with the intersection position P on the radially inner side, and therefore, the first layer 163 is more difficult to drop off from the base material 161 toward the direction in which the valve body 160 approaches the valve seat 110.

Further, in the embodiments shown in FIGS. 3 and 5, in the cross-section of the valve seat 110 shown in FIGS. 3 and 5, the intersection position P appears in two positions on radially inner and outer sides with reference to the central axis AXb of the valve body 160. The extension direction of the interface 117 at the intersection position P on the radially outer side of the intersection positions P in the two positions may be inclined with respect to the central axis AXb so as to recede from the central axis AXb toward the direction in which the valve body 160 approaches the valve seat 110 in the moving direction of the valve body 160.

In other words, in the embodiments shown in FIGS. 3 and 5, the tangent line L1 of the interface 117 at the intersection position P on the radially outer side may be inclined with respect to the central axis AXb so as to recede from the central axis AXb toward the direction in which the valve body 160 approaches the valve seat 110 in the moving direction of the valve body 160.

In the vicinity of the intersection position P on the radially outer side, the interface 117 is directed radially inward toward the direction in which the valve body 160 recedes from the valve seat 110 in the moving direction of the valve body 160. Therefore, even if the first layer 113 is separated from the base material 111 at the interface 117, the first layer 113 interferes with the intersection position P on the radially outer side, and therefore, the first layer 113 is more difficult to drop off from the base material 111 toward the direction in which the valve body 160 recedes from the valve seat 110.

(Thickness of First Layer 113, 163)

Figure 6:
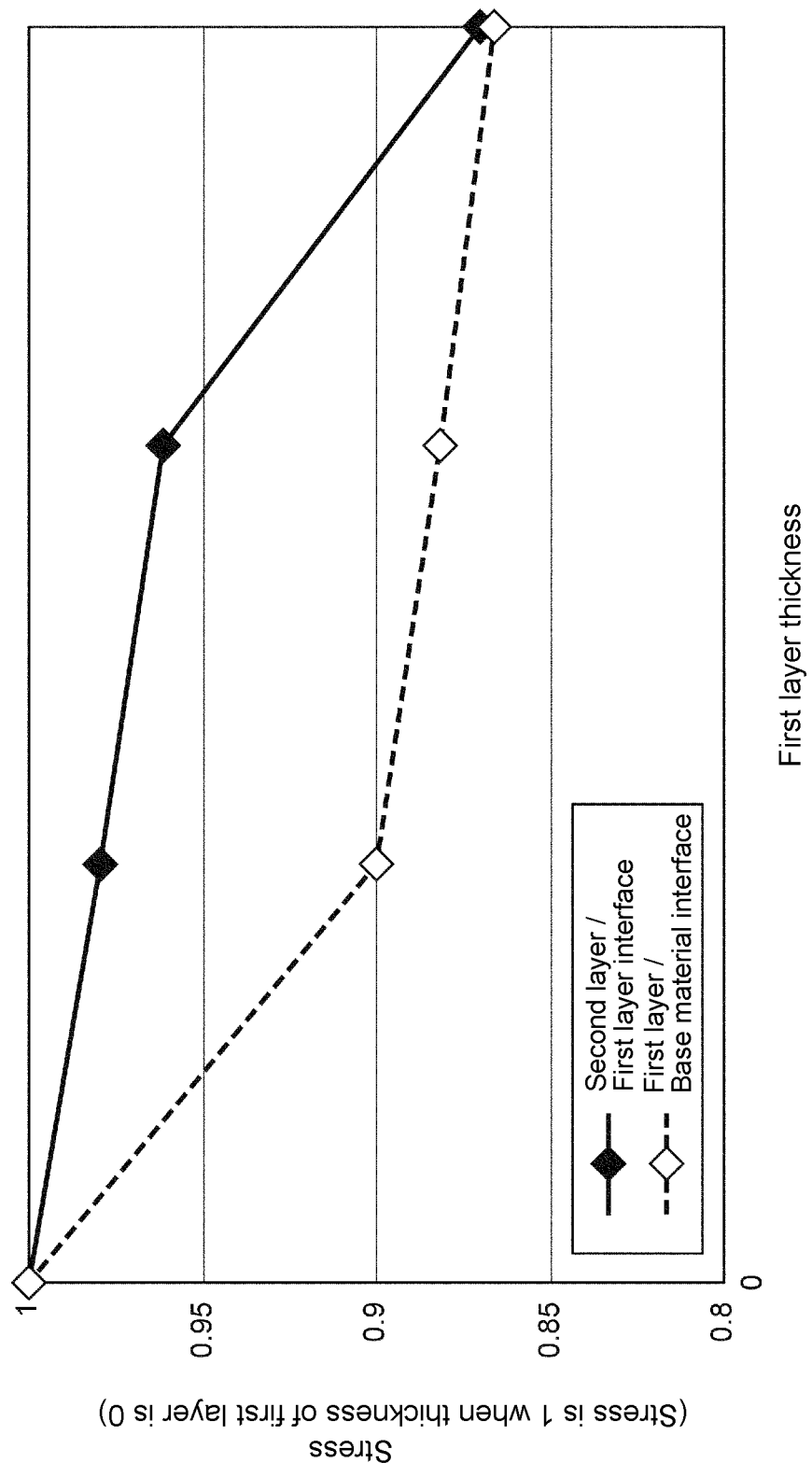
FIG. 6 is a graph for explaining stress at an interface between a base material and a first layer and stress at an interface between a first layer and a second layer when the thickness of the first layer is changed.

FIG. 6 is a graph for explaining stress at the interface 117, 167 between the base material 111, 161 and the first layer 113, 163 and stress at the interface 118, 168 between the first layer 113, 163 and the second layer 115, 165 when the thickness of the first layer 113, 163 is changed. In the graph of FIG. 6, the horizontal axis represents the thickness of the first layer 113, 163, and the vertical axis represents the stress with the stress at the interface between the base material 111, 161 and the second layer 115, 165 when the thickness of the first layer 113, 163 is 0, that is, when the first layer 113, 163 is not formed being 1. The thicknesses of the base material 111, 161 and the second layer 115, 165 remain unchanged. Further, the stress referred to here is thermal stress caused by the difference in linear expansion coefficient between the base material 111, 161, the first layer 113, 163, and the second layer 115, 165.

As is seen from the graph of FIG. 6, as the thickness of the first layer 113, 163 increases, the stress at the interface 117, 167 between the base material 111, 161 and the first layer 113, 163 and the stress at the interface 118, 168 between the first layer 113, 163 and the second layer 115, 165 decrease.

This is because the linear expansion coefficient of the nickel-based alloy constituting the first layer 113, 163 is between the linear expansion coefficient of the iron-based alloy constituting the base material 111, 161 and the linear expansion coefficient of the cobalt-based alloy constituting the second layer 115, 165.

However, as the thickness of the first layer 113, 163 increases, the cost required to form the first layer 113, 163 also increases.

In addition, since the cobalt-based alloy constituting the second layer 115, 165 is also a relatively expensive alloy, the amount used should be small.

Considering these, the ratio of the thickness of the second layer 115, 165 to the thickness of the first layer 113, 163 is preferably in the range of 1:2 to 2:1.

The present disclosure is not limited to the embodiments described above, but includes modifications to the embodiments described above, and embodiments composed of combinations of those embodiments.

The contents described in the above embodiments would be understood as follows, for instance.

(1) A steam valve 100 according to at least one embodiment of the present disclosure includes a valve seat 110 and a valve body 160. Each of the valve body 160 and the valve seat 110 has: a first layer 113, 163 formed on a base material 111, 161 and made of a material different from the base material 111, 161; and a second layer 115, 165 formed on the first layer 113, 163 at least in a contact position 103 between the valve body 160 and the valve seat 110 and made of a material different from the base material 111, 161 and the first layer 113, 163. On at least one of one side or the other side of a steam passage 101 separated by the contact position 103 between the valve body 160 and the valve seat 110, regarding at least one of the valve body 160 or the valve seat 110, the minimum curvature radius of the first layer 113, 163 in a cross-section along a moving direction of relative movement between the valve body 160 and the valve seat 110 is equal to or larger than the smaller of the minimum curvature radius of the surface of the base material 111, 161 or the minimum curvature radius of the surface of the second layer 115, 165.

With the configuration (1), in a cross-section along the direction of relative movement between the valve body 160 and the valve seat 110, the curvature radius of the surface of the first layer 113, 163 is equal to or larger than the minimum curvature radius $r_{min}$ of the surface of the valve body 160 or the valve seat 110. Therefore, compared to the case where the curvature radius r1 of the surface of the first layer 113, 163 is smaller than the smaller minimum curvature radius $r_{min}$ of the minimum curvature radius $r_{min}$ of the surface 111a, 161a of the base material 111, 161 or the minimum curvature radius $r_{min}$ of the surface 115a, 165a of the second layer 115, 165, it is possible to suppress wear of the surface 113a, 163a of the first layer 113, 163 due to high-temperature and high-pressure steam flowing through the steam passage 101 in the valve at high speed.

(2) In some embodiments, in the above configuration (1), in the cross-section, an intersection angle θ between an interface 117, 167 between the base material 111, 161 and the first layer 113, 163 and the surface 111a, 161a of the base material 111, 161 may be equal to or larger than 90 degrees at an intersection position P between the interface 117, 167 and the surface 111a, 161a of the base material 111, 161.

With the above configuration (2), compared to the case where the intersection angle θ is smaller than 90 degrees at the intersection position P, when the first layer 113, 163 is overlaid on the base material 111, 161 by welding, the shape of the corners of the base material 111, 161 corresponding to the intersection positions P is less likely to collapse.

(3) In some embodiments, in the above configuration (2), in the cross-section of the valve body 160, the intersection position P appears in two positions on radially inner and outer sides with reference to the central axis AXb of the valve body 160. The extension direction of the interface 167 at the intersection position P on the radially inner side of the intersection positions P in the two positions may be inclined with respect to the central axis AXb so as to approach the central axis AXb toward the direction in which the valve body 160 approaches the valve seat 110 in the moving direction.

With the above configuration (3), in the vicinity of the intersection position P on the radially inner side, the interface 167 is directed radially inward toward the direction in which the valve body 160 approaches the valve seat 110 in the moving direction. Therefore, when the valve body 160 before forming the first layer 163 is viewed from the valve seat 110 side along the central axis AXb, the surface of the groove in the valve body 160, i.e., the surface of the base material 161, on which the first layer 163 is to be formed, is not hidden by the portion corresponding to the intersection position P on the radially inner side. Therefore, when the valve body 160 before forming the first layer 163 is welded from the valve seat 110 side along the central axis AXb to form the first layer 163, the portion corresponding to the intersection position P on the radially inner side does not interfere with the formation of the first layer 163. This facilitates the formation of the first layer 163 in the valve body 160.

(4) In some embodiments, in the above configuration (2) or (3), in the cross-section of the valve seat 110, the intersection position P appears in two positions on radially inner and outer sides with reference to the central axis AXb of the valve body 160. The extension direction of the interface 117 at the intersection position P on the radially outer side of the intersection positions P in the two positions may be inclined with respect to the central axis AXb so as to approach the central axis AXb toward the direction in which the valve body 160 approaches the valve seat 110 in the moving direction.

With the above configuration (4), in the vicinity of the intersection position P on the radially outer side, the interface 117 is directed radially outward toward a direction in which the valve body 160 recedes from the valve seat 110 in the moving direction. Therefore, when the valve seat 110 before forming the first layer 113 is viewed from the valve body 160 side along the central axis AXb, the surface of the groove in the valve seat 110, i.e., the surface of the base material 111, on which the first layer 113 is to be formed, is not hidden by the portion corresponding to the intersection position P on the radially outer side. Therefore, when the valve seat 110 before forming the first layer 113 is welded from the valve body 160 side along the central axis AXb to form the first layer 113, the portion corresponding to the intersection position P on the radially outer side does not interfere with the formation of the first layer 113. This facilitates the formation of the first layer 113 in the valve seat 110.

(5) In some embodiments, in the above configuration (2), in the cross-section of the valve body 160, the intersection position P appears in two positions on radially inner and outer sides with reference to the central axis AXb of the valve body 160. The extension direction of the interface 167 at the intersection position P on the radially inner side of the intersection positions P in the two positions may be inclined with respect to the central axis AXb so as to recede from the central axis AXb toward the direction in which the valve body 160 approaches the valve seat 110 in the moving direction.

With the above configuration (5), in the vicinity of the intersection position P on the radially inner side, the interface 167 is directed radially outward toward the direction in which the valve body 160 approaches the valve seat in the moving direction. Therefore, even if the first layer 163 is separated from the base material 161 at the interface 167, the first layer 163 interferes with the intersection position P on the radially inner side, and therefore, the first layer 163 is more difficult to drop off from the base material 161 toward the direction in which the valve body 160 approaches the valve seat 110.

(6) In some embodiments, in the above configuration (2) or (5), in the cross-section of the valve seat 110, the intersection position P appears in two positions on radially inner and outer sides with reference to the central axis AXb of the valve body 160. The extension direction of the interface 117 at the intersection position P on the radially outer side of the intersection positions P in the two positions may be inclined with respect to the central axis AXb so as to recede from the central axis AXb toward the direction in which the valve body 160 approaches the valve seat 110 in the moving direction.

With the above configuration (6), in the vicinity of the intersection position P on the radially outer side, the interface 117 is directed radially inward toward a direction in which the valve body 160 recedes from the valve seat 110 in the moving direction. Therefore, even if the first layer 113 is separated from the base material 111 at the interface 117, the first layer 113 interferes with the intersection position P on the radially outer side, and therefore, the first layer 113 is more difficult to drop off from the base material 111 toward the direction in which the valve body 160 recedes from the valve seat 110.

REFERENCE SIGNS LIST

100 Steam valve
101 Steam passage
103 Contact position
110 Valve seat
111 Base material
113 First layer
115 Second layer
117 Interface
160 Valve body
161 Base material
163 First layer
165 Second layer
167 Interface

The invention claimed is:

1. A steam valve, comprising:
a valve seat; and
a valve body,
wherein each of the valve body and the valve seat has:
a first layer formed on a base material and made of a material different from the base material;
a second layer formed on the first layer at least in a contact position between the valve body and the valve seat and made of a material different from the base material and the first layer,
wherein the first layer is disposed to suppress cracking of the second layer, and
wherein, on at least one of one side or the other side of a steam passage for guiding steam to a steam turbine separated by the contact position between the valve body and the valve seat, regarding a curvature radius of a surface that faces the steam passage in at least one of the valve body or the valve seat, a minimum curvature radius of a surface of the first layer in a cross-section along a moving direction of relative movement between the valve body and the valve seat is equal to or larger than the smaller of a minimum curvature radius of a surface of the base material or a minimum curvature radius of a surface of the second layer.

2. The steam valve according to claim 1,
wherein, in the cross-section, an intersection angle between an interface between the base material and the first layer and the surface of the base material is equal to or larger than 90 degrees at an intersection position between the interface and the surface of the base material.

3. The steam valve according to claim 2,
wherein, in the cross-section of the valve body, the intersection position appears in two positions on radially inner and outer sides with reference to a central axis of the valve body, and
wherein an extension direction of the interface at the intersection position on the radially inner side of the intersection positions in the two positions is inclined with respect to the central axis so as to approach the central axis toward a direction in which the valve body approaches the valve seat in the moving direction.

4. The steam valve according to claim 2,
wherein, in the cross-section of the valve seat, the intersection position appears in two positions on radially inner and outer sides with reference to a central axis of the valve body, and
wherein an extension direction of the interface at the intersection position on the radially outer side of the intersection positions in the two positions is inclined with respect to the central axis so as to approach the central axis toward a direction in which the valve body approaches the valve seat in the moving direction.

5. The steam valve according to claim 2,
wherein, in the cross-section of the valve body, the intersection position appears in two positions on radially inner and outer sides with reference to a central axis of the valve body, and
wherein an extension direction of the interface at the intersection position on the radially inner side of the intersection positions in the two positions is inclined with respect to the central axis so as to recede from the central axis toward a direction in which the valve body approaches the valve seat in the moving direction.

6. The steam valve according to claim 2,
wherein, in the cross-section of the valve seat, the intersection position appears in two positions on radially inner and outer sides with reference to a central axis of the valve body, and
wherein an extension direction of the interface at the intersection position on the radially outer side of the intersection positions in the two positions is inclined with respect to the central axis so as to recede from the central axis toward a direction in which the valve body approaches the valve seat in the moving direction.

7. A steam valve, comprising:
a valve seat; and
a valve body,
wherein each of the valve body and the valve seat has:
  a first layer formed on a base material and made of a material different from the base material;
  a second layer formed on the first layer at least in a contact position between the valve body and the valve seat and made of a material different from the base material and the first layer,
wherein the first layer is disposed to suppress cracking of the second layer, and
wherein, on at least one of one side or the other side of a steam passage for guiding steam to a steam turbine separated by the contact position between the valve body and the valve seat, regarding a curvature radius of a surface that faces the steam passage in at least one of the valve body or the valve seat, a minimum curvature radius of a surface of the first layer in a cross-section along a moving direction of relative movement between the valve body and the valve seat is equal to or larger than the smaller of a minimum curvature radius of a surface of the base material or a minimum curvature radius of a surface of the second layer, and
wherein, on at least one of the one side or the other side of the steam passage separated by the contact position, regarding the curvature radius of the surface that faces the steam passage in the valve seat, the minimum curvature radius of the surface of the base material and the minimum curvature radius of the surface of the second layer are different from each other in the cross-section along the moving direction.

* * * * *